(12) United States Patent
Yoshie et al.

(10) Patent No.: US 9,902,886 B2
(45) Date of Patent: Feb. 27, 2018

(54) PRESSURE-SENSITIVE ADHESIVE COMPOSITION AND PRESSURE-SENSITIVE ADHESIVE SHEET

(71) Applicant: NITTO DENKO CORPORATION, Ibaraki-shi, Osaka (JP)

(72) Inventors: Satomi Yoshie, Ibaraki (JP); Shigeki Ishiguro, Ibaraki (JP); Hiroki Senda, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/385,194

(22) PCT Filed: Mar. 7, 2013

(86) PCT No.: PCT/JP2013/056325
§ 371 (c)(1),
(2) Date: Sep. 15, 2014

(87) PCT Pub. No.: WO2013/137109
PCT Pub. Date: Sep. 19, 2013

(65) Prior Publication Data
US 2015/0050493 A1 Feb. 19, 2015

(30) Foreign Application Priority Data
Mar. 16, 2012 (JP) .................. 2012-060682
Mar. 5, 2013 (JP) .................. 2013-043217

(51) Int. Cl.
| | |
|---|---|
| C09J 167/06 | (2006.01) |
| C09J 171/02 | (2006.01) |
| C08G 63/12 | (2006.01) |
| C08G 63/553 | (2006.01) |
| C09J 167/08 | (2006.01) |
| C09J 7/02 | (2006.01) |
| C08L 71/02 | (2006.01) |
| C08G 18/48 | (2006.01) |
| C08G 18/40 | (2006.01) |
| C08G 18/42 | (2006.01) |
| C09J 175/04 | (2006.01) |

(52) U.S. Cl.
CPC ........ *C09J 167/06* (2013.01); *C08G 18/4018* (2013.01); *C08G 18/4233* (2013.01); *C08G 18/4854* (2013.01); *C08G 63/12* (2013.01); *C08G 63/553* (2013.01); *C08L 71/02* (2013.01); *C09J 7/0207* (2013.01); *C09J 167/08* (2013.01); *C09J 171/02* (2013.01); *C09J 175/04* (2013.01); C08G 2170/40 (2013.01); C09J 2467/00 (2013.01); Y10T 428/2852 (2015.01)

(58) Field of Classification Search
CPC ...... C09J 167/00; C09J 167/02; C09J 167/06; C09J 167/08; C09J 2467/00; C09J 7/0207; C08G 63/12–63/58; C08G 2170/40; Y10T 428/2852
See application file for complete search history.

(56) References Cited

U.S. PATENT DOCUMENTS

| | | | |
|---|---|---|---|
| 6,605,347 B2 * | 8/2003 | Amano | C08G 18/44 428/343 |
| 6,713,184 B1 * | 3/2004 | Ferencz | B32B 7/12 156/332 |
| 2002/0120093 A1 * | 8/2002 | Amano | C08G 18/44 528/272 |
| 2011/0135924 A1 | 6/2011 | Takahira et al. | |
| 2011/0257273 A1 * | 10/2011 | Yabuuchi | C08G 18/4063 514/772.3 |
| 2012/0202058 A1 | 8/2012 | Takahira et al. | |
| 2012/0208955 A1 | 8/2012 | Yoshie et al. | |

FOREIGN PATENT DOCUMENTS

| | | |
|---|---|---|
| EP | 2 290 000 A1 | 3/2011 |
| EP | 2 460 864 A1 | 6/2015 |
| JP | 63-235359 A | 9/1988 |
| JP | 05-239429 A | 9/1993 |

(Continued)

OTHER PUBLICATIONS

Extended Search Report issued in corresponding Foreign Patent Application No. 13761189.3 dated Oct. 1, 2015.
Chinese Search Report issued in corresponding Chinese Patent Application No. 201380009249.2.
PCT/IB/338 with attached International Preliminary Report on Patentability and Written Opinion, received in counterpart PCT/JP2013/056325.

(Continued)

*Primary Examiner* — Scott R Walshon
(74) *Attorney, Agent, or Firm* — Sughrue Mion, PLLC

(57) ABSTRACT

A polyester-based pressure-sensitive adhesive composition which can be produced even from plant-derived raw materials with no need of using a costly silicone-based pressure-sensitive adhesive or the like and which is usable for producing a pressure-sensitive adhesive sheet excellent in wettability to an adherend, light peelability (removability), anti-staining property (little adhesive residues), and workability, and to provide a pressure-sensitive adhesive sheet using the composition. A polyester-based pressure-sensitive adhesive composition comprising a polyester obtained by condensation polymerization of at least a carboxylic acid component and a diol component, and a crosslinking agent, wherein the carboxylic acid component contains a dicarboxylic acid having a side chain in an amount of 50 to 90% by weight and a tricarboxylic acid having a side chain in an amount of 10 to 50% by weight, and wherein the polyester has a weight average molecular weight of 5000 to 150000.

6 Claims, No Drawings

(56) References Cited

FOREIGN PATENT DOCUMENTS

| | | |
|---|---|---|
| JP | 08-120061 A | 5/1996 |
| JP | 2007-327012 A | 12/2007 |
| JP | 2008-013593 A | 1/2008 |
| JP | 2009-221440 A | 10/2009 |
| JP | 2010-248489 A | 11/2010 |
| JP | 2012-036278 A | 2/2012 |
| WO | 2010/016514 A1 | 2/2010 |
| WO | 2011/049111 A1 | 4/2011 |
| WO | 2011/049114 A1 | 4/2011 |

OTHER PUBLICATIONS

International Search Report for PCT/JP2013/056325, dated Jun. 4, 2013.
Chinese Office Action issued in corresponding Chinese Patent Application No. 201380009249.2 dated Feb. 16, 2016.
Office Action dated Sep. 13, 2016 from the Japanese Patent Office in corresponding Japanese Application No. 2013-043217 English Translation.

\* cited by examiner

PRESSURE-SENSITIVE ADHESIVE COMPOSITION AND PRESSURE-SENSITIVE ADHESIVE SHEET

CROSS REFERENCE TO RELATED APPLICATIONS

This application is a National Stage of International Application No. PCT/JP2013/056325, filed Mar. 7, 2013, claiming priority from Japanese Patent Application Nos. 2012-060682, filed Mar. 16, 2012 and JP 2013-043217, filed Mar. 5, 2013, the contents of all of which are incorporated herein by reference in their entirety.

TECHNICAL FIELD

The present invention relates to a polyester-based pressure-sensitive adhesive composition and a pressure-sensitive adhesive sheet using the composition.

BACKGROUND ART

In recent years, those having good wettability to a display surface as an adherend, and having adhesive strength proper for light peeling at the time of peeling off are required as a pressure-sensitive adhesive sheet for surface protection to be used for surface protection of display surfaces of electronic mobile appliances including smart phones as well as personal computers, televisions, and the like.

A pressure-sensitive adhesive sheet for surface protection (surface protective sheet) is peeled off after bonding and again bonded, and these operations are often repeated in many cases. Because of this, proper wettability is necessary and it is required that the sheet can be re-bonded while giving good appearance by manual bonding.

In such requests, silicone-based pressure-sensitive adhesives having high wettability have been used as pressure-sensitive adhesives for surface protection; however, they have a problem of high cost.

Further, awareness of environments has been considered to be important year by year, and extrication from dependence on petroleum is supposed to be an urgent issue, and it is highly expected to transfer to plant-derived materials without using petroleum resources as much as possible. In such a situation, a polyester-based pressure-sensitive adhesive using a dimer acid and a dimer diol derived from plants has been discussed (Patent Document 1), but also has a problem of high cost.

Therefore, in order to solve the above-mentioned problems, pressure-sensitive adhesive sheets for surface protection by using low cost acryl-based pressure-sensitive adhesives have been proposed (reference to Patent Documents 2 and 3).

However, in the case of using the acryl-based pressure-sensitive adhesives, a plasticizer is used and there occurs a problem of bleeding out of a plasticizer component and thus causing staining of an adherend after the acryl-based pressure-sensitive adhesives are bonded to a display surface as an adherend.

PRIOR ART DOCUMENT

Patent Documents

Patent Document 1: JP-A-2008-13593
Patent Document 2: JP-A-2007-327012
Patent Document 3: JP-A-2010-248489

SUMMARY OF THE INVENTION

Problems to be Solved by the Invention

Accordingly, the present invention aims to provide a polyester-based pressure-sensitive adhesive composition which can be produced even from plant-derived raw materials with no need of using a costly silicone-based pressure-sensitive adhesive or the like and which is usable for producing a pressure-sensitive adhesive sheet excellent in wettability to an adherend, light peelability (removability), anti-staining property (little adhesive residues), and workability, and to provide a pressure-sensitive adhesive sheet using the composition for uses including surface protection.

Means for Solving the Problems

The inventors of the present invention have made various investigations in order to solve the above-mentioned problems, and consequently found a polyester-based pressure-sensitive adhesive composition and a pressure-sensitive adhesive sheet as described below, and this finding has led to completion of the present invention.

That is, the polyester-based pressure-sensitive adhesive composition of the present invention is a polyester-based pressure-sensitive adhesive composition comprising a polyester obtained by condensation polymerization of at least a carboxylic acid component and a diol component, and a crosslinking agent, wherein the carboxylic acid component contains a dicarboxylic acid having a side chain in an amount of 50 to 90% by weight and a tricarboxylic acid having a side chain in an amount of 10 to 50% by weight, and wherein the polyester has a weight average molecular weight of 5000 to 150000.

In the polyester-based pressure-sensitive adhesive composition of the present invention, the diol component preferably contains an aliphatic diol having 3 to 10 carbon atoms.

The polyester-based pressure-sensitive adhesive composition of the present invention further preferably contains a polyether polyol.

The pressure-sensitive adhesive sheet of the present invention is a pressure-sensitive adhesive sheet comprising a support and a pressure-sensitive adhesive layer obtained by crosslinking the polyester-based pressure-sensitive adhesive composition and formed on at least one surface of the support, wherein the pressure-sensitive adhesive layer has a gel fraction of 70 to 98% by weight.

The pressure-sensitive adhesive sheet of the present invention preferably has an adhesive strength to glass of 0.5 N/25 mm or less.

The pressure-sensitive adhesive sheet of the present invention is preferably used for surface protection.

Effect of the Invention

The present invention can provide a polyester-based pressure-sensitive adhesive composition which can be produced even from plant-derived raw materials with no need of using a costly silicone-based pressure-sensitive adhesive or the like and which is usable for producing a pressure-sensitive adhesive sheet excellent in wettability to an adherend, light peelability (removability), anti-staining property (little adhesive residues produced), and workability, and a pressure-sensitive adhesive sheet using the composition, and thus the present invention is useful.

Mode for Carrying out the Invention

Hereinafter, embodiments of the present invention will be described in detail.
<Polyester>

The polyester to be used for the polyester-based pressure-sensitive adhesive composition of the present invention is a polyester obtained by condensation polymerization of at least a carboxylic acid component and a diol component, wherein the carboxylic acid component contains a dicarboxylic acid having a side chain in an amount of 50 to 90% by weight and a tricarboxylic acid having a side chain in an amount of 10 to 50% by weight, and wherein the polyester has a weight average molecular weight of 5000 to 150000. A polyester synthesis method is not particularly limited, and a publicly-known polymerization method may be used.

It is a preferable embodiment that the polyester is produced from plant-derived raw materials. The reason for this is that a plant-derived raw material is biodegradable, is said to be so-called carbon neutral, is friendly to global environments, and is suitable for obtaining an environment-friendly pressure-sensitive adhesive.

The polyester-based pressure-sensitive adhesive composition of the present invention contains at least a carboxylic acid component, and the carboxylic acid component contains at least a dicarboxylic acid having two carboxylic group and a tricarboxylic acid having three carboxylic groups, and the carboxylic acid component contains a dicarboxylic acid having a side chain in an amount of 50 to 90% by weight and a tricarboxylic acid having a side chain in an amount of 10 to 50% by weight, preferably the dicarboxylic acid in an amount of 60 to 85% by weight and the tricarboxylic acid in an amount of 15 to 40% by weight, and more preferably the dicarboxylic acid in an amount of 65 to 80% by weight and the tricarboxylic acid in an amount of 20 to 35% by weight. If the amounts are within the range, a three-dimensional crosslinking structure can be effectively formed in the inside of the polymer, and therefore it is a preferable embodiment.

The dicarboxylic acid is one which has a side chain and two carboxyl groups as a functional group, and is preferably one having an alkyl group as the side chain. The dicarboxylic acid has a side chain, and therefore the flexibility is increased. Further the side chain is an alkyl group, which makes hydrolysis of the polyester difficult to be caused, and therefore it is a preferable embodiment.

Specific examples of the dicarboxylic acid include plant-derived dicarboxylic acids. Examples of other dicarboxylic acids include aliphatic and alicyclic dicarboxylic acids such as adipic acid, azelaic acid, 1,4-cyclohexanedicarboxylic acid, fumaric acid, succinic acid, dodecanedioic acid, maleic acid, maleic anhydride, and itaconic acid; as well as terephthalic acid, isophthalic acid, orthophthalic acid, 1,5-naphthalenedicarboxylic acid, 2,6-naphthalenedicarboxylic acid, 4,4'-diphenyldicarboxylic acid, 2,2'-diphenyldicarboxylic acid, and 4,4'-diphenyl ether dicarboxylic acid. Specific examples of the dicarboxylic acid having a side chain include plant-derived dicarboxylic acids such as dimer acids derived from a castor oil-derived sebacic acid, oleic acid and erucic acid, 4-methyl-1,2-cyclohexanedicarboxylic acid, dodecenyl succinic anhydride, hexahydrophthalic anhydride, tetrahydrophthalic anhydride, and citraconic acid. Among them, dimer acids and the like are preferable in terms of plant-derived acids and friendliness to global environments. These acids may be used alone or in combination of two or more of them.

The tricarboxylic acid is one which has a side chain and three carboxyl groups as a functional group, and preferably one having an alkyl as the side chain. The tricarboxylic acid has a side chain, and therefore the flexibility is increased.

Further the side chain is an alkyl group, which can make hydrolysis of the polyester difficult to be caused. The use of the tricarboxylic acid makes it possible to form a network structure (three-dimensional crosslinking structure) whereas a polyester obtained by polymerizing a dicarboxylic acid is usually linear, and owing to this configuration, the pressure-sensitive adhesive layer can be hard, and the pressure-sensitive adhesive layer (pressure-sensitive adhesive sheet) can have adhesive strength suppressed to be low. At the time of peeling the pressure-sensitive adhesive layer, deformation or breaking on a support is not caused, light peelability (removability) can be easily attained, and excellent workability can be provided, and therefore it is a preferable embodiment.

Specific examples of the tricarboxylic acid include plant-derived tricarboxylic acids of aliphatic carboxylic acids such as aconitic acid, citric acid, isocitric acid, oxalosuccinic acid, and tricarballylic acid; aromatic tricarboxylic acids such as hemimellitic acid and trimesic acid. Specific examples of the tricarboxylic acid having a side chain include trimer acids and the like that are trimers of unsaturated aliphatic carboxylic acids such as oleic acid. Commercialized products containing a tricarboxylic acid component together with a dicarboxylic acid component are also usable. Among them, trimer acids and the like that are trimers of unsaturated aliphatic carboxylic acids such as oleic acid are preferable in terms of plant-derived acids and friendliness to global environments. These acids may be used alone or in combination of two or more of them.

There are commercialized products containing mainly a dicarboxylic acid component and also containing a tricarboxylic acid, that is, products with low purity of dicarboxylic acids. The commercialized products are economical because of low purity of dicarboxylic acids, and therefore it is a preferable embodiment since cost can be saved. Examples of the commercialized products include PRIPOL 1015, PRIPOL 1017, PRIPOL 1022, and PRIPOL 1025 (manufactured by Croda).

The polyester-based pressure-sensitive adhesive composition of the present invention contains at least a diol component, and those having two hydroxyl groups in the molecule may be used as the diol component without any particular limitation, but it is preferable to use an aliphatic diol having 3 to 10 carbon atoms, and it is more preferable to use an aliphatic diol having 4 to 8 carbon atoms. The use of the diol component can provide low adhering strength and high wettability, and further, in the case of using the aliphatic diol, if the carbon number is less than 3, the diol component tends to be evaporated easily because of lowering its boiling point at the time of production (polymerization) of the polyester, and consequently an increase in viscosity is generated and the polymerization of the polyester cannot be controlled. On the other hand, if the carbon number exceeds 10, the diol tends to be crystallized easily even at room temperature, becomes inferior in handleability (workability) and may become disadvantageous in terms of cost, and therefore it is not preferable. In addition, high wettability prevents inclusion of air bubbles at the time of bonding the pressure-sensitive adhesive sheet (surface protective film) to an adherend, and gives good appearance. Further, high wettability keeps good appearance even in the case of bonding the pressure-sensitive adhesive sheet again after peeling the pressure-sensitive adhesive sheet, and therefore it is a preferable embodiment.

Examples of the diol component include, as plant-derived diols, aliphatic esters derived from castor oil, dimer diols derived from oleic acid, erucic acid etc., and glycerol monostearate. Examples of other diol components include aliphatic glycols such as ethylene glycol, 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol; and, as those other than the aliphatic glycols, bisphenol A ethylene oxide adducts and propylene oxide adducts, hydrogenated bisphenol A ethylene oxide adducts and propylene oxide adducts, polytetramethylene glycol, polypropylene glycol, polyethylene glycol, and polycarbonate glycol. Among them, the use of an aliphatic diol having 3 to 10 carbon atoms is preferable in terms of cost and handling easiness at the time of polymerization, and specific examples of the diol component include aliphatic glycols such as 1,2-propylene glycol, 1,3-propanediol, 2-methyl-1,3-propanediol, 1,2-butanediol, 1,3-butanediol, 1,4-butanediol, 1,5-pentanediol, 1,6-hexanediol, 3-methyl-1,5-pentanediol, neopentyl glycol, diethylene glycol, dipropylene glycol, 2,2,4-trimethyl-1,5-pentanediol, 2-ethyl-2-butylpropanediol, 1,9-nonanediol, 2-methyloctanediol, 1,10-decanediol, 1,4-cyclohexanedimethanol, and 1,2-cyclohexanedimethanol. Particularly, plant-derived aliphatic diols are preferable in terms of friendliness to global environments. These dials may be used alone or in combination of two or more of them.

The mole ratio of the carboxylic acid component and the diol component is preferably 1:(1.08 to 2.10), more preferably 1:(1.09 to 2.05), and furthermore preferably 1:(1.10 to 2.00). If the mole ratio is smaller than 1:1.08, the molecular weight of the polyester to be obtained becomes high, and a hydroxyl group to be served as a functional group is lessened to make it difficult to accelerate crosslinking reaction even if a crosslinking agent (e.g., polyfunctional isocyanate) is used, so that a pressure-sensitive adhesive layer with a desired gel fraction is not obtained. On the other hand, if the mole ratio exceeds 1:2.10, only a polyester with a molecular weight smaller than the desired molecular weight tends to be obtained, and even if a crosslinking agent is used, gelation cannot be promoted and it results in that a pressure-sensitive adhesive layer with a desired gel fraction is not obtained, and therefore it is not preferable. The mole number of the carboxylic acid component and the diol component are similar to each other, and when the mole ratio becomes close to 1:1, the molecular weight of the polyester to be obtained is increased, and thus the adhesive strength (peel strength) is increased and light peeling cannot be achieved. Accordingly, these are not preferable in the pressure-sensitive adhesive sheet for surface protection.

The polyester to be used for the polyester-based pressure-sensitive adhesive composition of the present invention is characterized by having a weight average molecular weight of 5000 to 150000, preferably 5500 to 100000, and more preferably 6000 to 50000. The case where the weight average molecular weight is less than 5000 causes a decrease in adhesive strength of a pressure-sensitive adhesive using the polyester, and a pressure-sensitive adhesive sheet (pressure-sensitive adhesive layer) itself may not be fixed to an adherend. On the other hand, the case where the weight average molecular weight exceeds 150000 causes an increase in viscosity during the production (polymerization) of the polyester, and the handling property may be inferior, and therefore it is not preferable.

Other components other than the carboxylic acid component and the diol component can be polymerized or added after polymerization to an extent that the properties of the polyester to be used for the pressure-sensitive adhesive sheet of the present invention are not adversely affected.

In the present invention, the polymerization (condensation polymerization) reaction of the carboxylic acid component and the diol component may be carried out using a solvent or using no solvent under reduced pressure, and a conventionally known method may be used.

Examples of a method of removing water produced by the polymerization (condensation) reaction include a method in which azeotropic dehydration is conducted using toluene or xylene, a method in which an inert gas is bubbled into a reaction system thereby ejecting produced water and mono-alcohol out of the reaction system, together with the inert gas, and a method of distilling under reduced pressure.

It is possible to use, as a polymerization catalyst used in the polymerization (condensation) reaction, those used as a polymerization catalyst used in a conventional polyester, and examples of usable polymerization catalyst include, but are not limited to, various metal compounds such as titanium-based, tin-based, antimony-based, zinc-based and germanium-based compounds; and strong acid compounds such as p-toluenesulfonic acid and sulfuric acid.

<Polyester-based Pressure-sensitive Adhesive Composition>

The polyester-based pressure-sensitive adhesive composition of the present invention is preferable to further contain a polyether polyol, and more preferable to contain at least one reactive functional group at molecular terminals. A polyether polyol can be added in the pressure-sensitive adhesive composition by containing (blending) the polyether polyol and carrying out crosslinking reaction with the use of a crosslinking agent. Consequently, an adherend is not stained and the adhesion is further lowered, and therefore it is a preferable embodiment.

The polyether polyol is not particularly limited and conventionally known polyether polyols can be used, and examples thereof include polyoxyalkylene glycols such as polyethylene glycol, polypropylene glycol, polybutylene glycol, polytetramethylene glycol, and polytrimethylene ether glycol; copolyether polyols of 1 to 20% by mole 3-methyltetrahydrofuran and tetrahydrofuran copolymer (e.g., "PTG-L1000", "PTG-L2000", "PTG-L3000", etc., manufactured by Hodogaya Chemical Co., Ltd.); bifunctional polyether polyols such as copolyether glycols of neopentyl glycol and tetrahydrofuran; trifunctional polyether polyols such as trimethylolpropane tripolyoxyethylene ether; and tetrafunctional polyether polyols such as pentaerythritol polyoxyethylene ether. Further, the polyether polyol may be block copolymer-based and random copolymer-based polyether polyols such as polyoxyethylene-polyoxypropylene glycol. Further, part of terminal hydroxyl groups may be modified with aliphatic hydrocarbon groups such as a methyl group, an ethyl group, an allyl group, a propyl group, a butyl group, and a 2-ethylhexyl group; or aromatic hydrocarbon groups such as a phenyl group, a methylphenyl group, a nonylphenyl group, and a benzyl group to remove reactivity. However, if all of the functional groups are modified, the reactivity is completely removed and crosslinking reaction with polymer cannot be caused, and it results in bleeding out of the polyether polyol itself to the pressure-sensitive adhesive surface. Polyether polyol which can provide particularly good adhesive properties are those having branched chains in the molecular skeletons such as polypropylene glycol and polybutylene glycol. It is supposed that the polymer chain mobility is high and the contribution in the vicinity of the pressure-sensitive adhesive surface becomes significant. Further, those obtained by modifying one terminal of these polyether polyols are more useful. It is supposed that the polymer chain at one terminal having non-reactivity by the modification is free, and thus the molecular mobility is heightened. Polyether polyols derived from plants are preferable in terms of friendliness to global environments. These polyether polyols may be used alone or in combination of two or more of them.

The polyether polyol has a number average molecular weight (Mn) of preferably 500 to 3500, and more preferably 1000 to 3000. If the number average molecular weight is less than 500, the effect of less-staining properties and the like cannot be obtained, and if the number average molecular weight is more than 3500, compatibility with the polyester is worsened, so that appearance defects may be caused, and therefore it is not preferable.

The blending amount of the polyether glycol is preferably 25 to 300 parts by weight, more preferably 50 to 250 parts by weight, and furthermore preferably 80 to 200 parts by weight based on 100 parts by weight of the polyester. If the blending amount is less than 30 parts by weight, the effect of less-staining properties and the like cannot be obtained, and if the blending amount is more than 300 parts by weight, compatibility with the polyester is worsened, so that appearance defects, bleed out or the like may be generated. This may result in leaving stains on an adherend, and therefore it is not preferable.

In the case of polyether polyols in which the terminal functional groups are not modified, the polyether polyol has a number average molecular weight of preferably 100 to 5000, more preferably 200 to 4000, and furthermore preferably 300 to 3000. If the molecular weight is less than 100, the effect of improving adhesive properties is small, and if the molecular weight is more than 5000, bleed out occurs. In the case of polyether polyols in which part of terminal functional groups is modified, the polyether polyol has a number average molecular weight of preferably 100 to 1500, more preferably 200 to 1200, and furthermore preferably 300 to 1000. If the molecular weight is less than 100, the effect of improving adhesive properties is small, and if the molecular weight is more than 1500, bleed out occurs. These polyether polyols may be used alone or in combination of two or more of them. Although the reasons are not clear in detail, it is supposed as follows: the use of a polyether polyol having a number average molecular weight within the above-mentioned range can shorten the distance between crosslinking points of polymer chains to increase the density of the polymer chains. Accordingly, the elastic modulus of the pressure-sensitive adhesive layer is increased after crosslinking, and the rigidity of the pressure-sensitive adhesive sheet is increased to make it difficult to deform the sheet by self weight. Consequently, at the time of bonding the sheet to an adherend, adhesion is not caused at many points and inclusion of air bubbles is not easily caused, and therefore an excellent pressure-sensitive adhesive sheet (pressure-sensitive adhesive layer) as compared with the case of using the polyether polyol having a number average molecular weight within the above-mentioned range. Because of the same reasons, it is possible to lower adhesive strength and it is advantageous as a sheet for surface protection.

In the case of polyether polyols in which the terminal functional groups are not modified, the blending amount of the polyether polyol is preferably 1 to 50 parts by weight, more preferably 3 to 45 parts by weight, and furthermore preferably 5 to 40 parts by weight based on 100 parts by weight of the polyester. If the blending amount is less than 1 part by weight, the effect of improving adhesive properties is small, and if the blending amount is more than 50 parts by weight, bleed out occurs. In the case of polyether polyols in which part of terminal functional groups is modified, the blending amount of the polyether polyol is preferably 1 to 35 parts by weight, more preferably 3 to 32 parts by weight, and furthermore preferably 5 to 28 parts by weight based on 100 parts by weight of the polyester. If the blending amount is less than 1 part by weight, the effect of improving adhesive properties is small, and if the blending amount is more than 35 parts by weight, bleed out occurs and therefore it is not preferable.

The polyester-based pressure-sensitive adhesive composition of the present invention contains a crosslinking agent. A pressure-sensitive adhesive layer can be formed by carrying out the crosslinking reaction of the pressure-sensitive adhesive composition using a crosslinking agent. The crosslinking agent is not particularly limited and conventionally known crosslinking agents can be used. Examples of the crosslinking agent that can be used include polyvalent isocyanurates, polyfunctional isocyanates, polyfunctional melamine compounds, polyfunctional epoxy compounds, polyfunctional oxazoline compounds, polyfunctional aziridine compounds, and metal chelate compounds. Particularly, in terms of transparency of the pressure-sensitive adhesive layer to be obtained and formation of a pressure-sensitive adhesive sheet (pressure-sensitive adhesive layer) with high gel fraction, the use of a polyvalent isocyanurate or a polyfunctional isocyanate compound is a preferable embodiment. These compounds may be used alone or in combination of two or more of them.

Examples of the polyvalent isocyanurate include a polyisocyanurate compound of hexamethylene diisocyanate. Use of the polyvalent isocyanurate is effective since it is possible to achieve an object of obtaining transparency and high gel fraction of the obtained pressure-sensitive adhesive layer. It is also possible to use commercially available products of the polyvalent isocyanurate and specific examples thereof include "DURANATE TPA-100" (trade name, manufactured by Asahi Kasei Chemicals Corporation), and "CORONATE HK", "CORONATE HX" and "CORONATE 2096" (trade names, manufactured by Nippon Polyurethane Industry Co., Ltd.).

As the polyfunctional isocyanate compound, a compound having at least two isocyanate groups in the molecule is preferably used, and a compound having three or more isocyanate groups in the molecule is more preferably used without any particular limitation. Specific examples may include aliphatic polyisocyanates, alicyclic polyisocyanates, and aromatic polyisocyanates.

Examples of the aliphatic polyisocyanates include tetramethylene diisocyanates such as 1,2-ethylene diisocyanate, 1,2-tetramethylene diisocyanate, 1,3-tetramethylene diisocyanate and 1,4-tetramethylene diisocyanate; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate and 2,5-hexamethylene diisocyanate; and 2-methyl-1,5-pentane diisocyanate, 3-methyl-1,5-pentane diisocyanate and lysin diisocyanate.

Examples of the alicyclic polyisocyanates include isophorone diisocyanate; cyclohexyl diisocyanates such as 1,2-cyclohexyl diisocyanate, 1,3-cyclohexyl diisocyanate and 1,4-cyclohexyl diisocyanate; cyclopentyl diisocyanates such as 1,2-cyclopentyl diisocyanate and 1,3-cyclopentyl diisocyanate; hydrogenated xylylene diisocyanate, hydrogenated tolylene diisocyanate, hydrogenated diphenylmethane diisocyanate, hydrogenated tetramethylxylene diisocyanate and 4,4'-dicyclohexylmethane diisocyanate.

Examples of the aromatic polyisocyanates include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenyletherdiisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate and xylylene-1,3-diisocyanate.

It is possible to use, as the polyfunctional isocyanate compound, for example, dimers and trimers of araliphatic polyisocyanates other than the aliphatic polyisocyanates, alicyclic polyisocyanates, aromatic polyisocyanates and araliphatic polyisocyanates. Specific examples thereof include a dimer and a trimer of diphenylmethane diisocyanate; a reaction product of trimethylolpropane and tolylene diisocyanate; a reaction product of trimethylolpropane and hexamethylene diisocyanate; and polymers such as polymethylene polyphenylisocyanate, polyether polyisocyanate and polyester polyisocyanate.

It is also possible to use commercially available products as the polyfunctional isocyanate compound, and specific examples thereof include "CORONATE L" (trade name, manufactured by Nippon Polyurethane Industry Co., Ltd.) as a trimer adduct of trimethylolpropane and tolylene diisocyanate, and "CORONATE HL" (trade name, manufactured by Nippon Polyurethane Industry Co., Ltd.) as a trimer adduct of trimethylolpropane and hexamethylene diisocyanate.

Examples of the polyfunctional melamine compound include methylated methylolmelamine and butylated hexamethylolmelamine, and examples of the polyfunctional epoxy compound include diglycidylaniline and glycerin diglycidyl ether.

The kind and blending amount of the crosslinking agent are not particularly limited, and in the case of a pressure-sensitive adhesive sheet, it is preferable to blend the crosslinking agent such that the pressure-sensitive adhesive layer to be formed has a gel fraction of 70 to 98% by weight, more preferably 72 to 97% by weight, and particularly preferably 74 to 96% by weight. If the gel fraction is less than 70% by weight, the adhesive strength (peel strength) may be increased over time or an adherend may be stained at the time of peeling the pressure-sensitive adhesive layer (pressure-sensitive adhesive sheet), and it may result in inferiority in light peelability (removability), and further it is not preferable in terms of handleability (workability).

On the other hand, if the gel fraction exceeds 98% by weight, the adhesive strength may be too low so that the pressure-sensitive adhesive sheet itself may not be fixed to an adherend, and particularly, the pressure-sensitive adhesive sheet cannot be also used for surface protection, and therefore it is not preferable.

The blending amount of the crosslinking agent is preferably, for example, 0.001 to 30 parts by weight, and more preferably 0.001 to 25 parts by weight based on 100 parts by weight of the polyester. If the blending amount is less than 0.001 parts by weight, the cohesive strength cannot be increased in the case of forming a pressure-sensitive adhesive layer, and heat resistance may be lowered. If the blending amount exceeds 30 parts by weight, defects that the adhesive strength is increased over time after bonding and that an adherend is stained may be caused, and therefore it is not preferable.

In order to efficiently adjust the gel fraction in the pressure-sensitive adhesive layer to be used for the pressure-sensitive adhesive sheet of the present invention, a crosslinking catalyst may be properly used. Examples of the catalyst include tetra-n-butyl titanate, tetraisopropyl titanate, butyltin oxide, and dioctyltin dilaurate. These catalysts may be used alone or in combination of two or more of them.

The blending amount of the catalyst is not particularly limited, but is preferably 0.01 to 1 part by weight and more preferably 0.05 to 0.5 parts by weight based on 100 parts by weight of the polyester. If the blending amount is less than 0.01 parts by weight, the effect of catalyst addition may not be obtained, and if the blending amount exceeds 1 part by weight, the shelf life is considerably shortened and the stability for application may be lowered, and therefore it is not preferable.

In order to prolong the shelf life, acetyl acetone, methanol, methyl orthoacetate, and the like may be also blended properly as a retarder.

In order to form a pressure-sensitive adhesive layer to be used for the pressure-sensitive adhesive sheet of the present invention, a tackifier may be used in combination with the polyester together with the crosslinking agent, and therefore a pressure-sensitive adhesive layer with desired properties can be formed.

The tackifier is not particularly limited, and conventionally and publicly-known tackifier can be used, and examples thereof include terpene-based tackifier, phenolic tackifier, rosin-based tackifier, aliphatic petroleum resins, aromatic petroleum resins, copolymer-based petroleum resins, alicyclic petroleum resins, xylene resins, epoxy-based tackifier, polyamide-based tackifier, ketone-based tackifier, and elastomer-based tackifier. Particularly, in order to improve a biomass degree, rosin-based tackifier and terpene-based tackifier produced from plant-derived raw materials are preferably used. These resins may be used alone or in combination of two or more of them. The biomass degree means the ratio of plant-derived raw materials to be used which is calculated from the weight of the plant-derived raw materials to be used to the weight of all raw materials to be used constituting the polyester-based pressure-sensitive adhesive composition.

Examples of the terpene-based tackifiers include terpene resins, terpene-phenol resins, and aromatic modified terpene resins, and specific examples of the terpene-based tackifiers that can be used include an α-pinene polymer, a β-pinene polymer, and a dipentene polymer, and terpene resins obtained by phenol modification, aromatic modification, hydrogenation modification, and hydrocarbon modification of the above polymers.

Specifically, it is possible to use, as the phenol-based tackifier, condensates of various phenols such as phenol, m-cresol, 3,5-xylenol, p-alkylphenol and resorcin, and formaldehyde can be used. It is also possible to use resol obtained by an addition reaction of the phenols and formaldehyde in the presence of an alkali catalyst, novolak obtained by a condensation reaction of the phenols and formaldehyde in the presence of an acid catalyst, and a rosin-modified phenol resin obtained by adding phenol to rosins such as an unmodified or modified rosin, or a derivatives thereof in the presence of an acid catalyst, followed by thermopolymerization.

Examples of the rosin-based tackifiers include rosin resins, polymerized rosin resins, hydrogenated rosin resins, rosin ester resins, hydrogenated rosin ester resins, and rosin phenol resins, and specific examples of the rosin-based tackifiers that can be used include unmodified rosins (raw rosins) such as gum rosin, wood rosin, and tall oil rosin; and modified rosins obtained by subjecting these unmodified rosins to hydrogenation, disproportionation, polymerization, and other chemical modification.

The blending amount of the tackifier is preferably 0 to 50 parts by weight, more preferably 2 to 30 parts by weight, and particularly preferably 5 to 20 parts by weight based on 100 parts by weight of the polyester. If the blending amount exceeds 50 parts by weight, the adhesive strength is increased and re-peeling may become difficult after exposure to high temperature environments, and therefore it is not preferable.

General additives such as an ultraviolet absorber, a photostabilizer, a peeling adjustment agent, a plasticizer, a softening agent, a filler, coloring agents such as a pigment and a dye, an aging prevention agent, and a surfactant may be used to an extent that the properties of the pressure-sensitive adhesive layer (pressure-sensitive adhesive) to be used for the pressure-sensitive adhesive sheet of the present invention are not adversely affected.

The thickness of the pressure-sensitive adhesive layer (after drying) may be properly selected, but the thickness is preferably, for example, about 1 to 100 µm, more preferably about 3 to 80 µm, and particularly preferably about 5 to 60 µm. If the thickness of the pressure-sensitive adhesive layer is thinner than 1 µm, it becomes difficult to obtain sufficient adhesive strength, and the pressure-sensitive adhesive sheet (pressure-sensitive adhesive layer) itself cannot be fixed to an adherend and may tend to be easily peeled. If the thickness exceeds 100 µm, the adhesive strength is increased over time so that the pressure-sensitive adhesive sheet is hard to be peeled, and therefore it is not preferable. The pressure-sensitive adhesive layer may be any of a mono layer form or a layered form.

The pressure-sensitive adhesive sheet of the present invention is obtained by comprising a support and the pressure-sensitive adhesive layer formed on at least one surface of the support. The pressure-sensitive adhesive sheet may have an interlayer or an undercoating layer without any problem to an extent that the properties of the pressure-sensitive adhesive sheet of the present invention are not adversely affected.

The support is not particularly limited and conventionally known supports can be used, that is, various kinds of supports (substrates) such as a plastic film, porous materials including paper sheets and non-woven fabrics may be used. In the case of use for surface protection, it is a preferable embodiment to use a plastic film in terms of durability and the like. Examples of the plastic film may include polyolefin films of polyethylene, polypropylene, poly-1-butene, poly-4-methyl-1-pentene, ethylene-propylene copolymer, ethylene-1-butene copolymer, ethylene-vinyl acetate copolymer, ethylene-ethyl acrylate copolymer, ethylene-vinyl alcohol copolymer, and the like; polyester films of polyethylene terephthalate, polyethylene naphthalate, polybutylene terephthalate, and the like; polyacrylate films; polystyrene films; polyamide films of nylon6, nylon6,6, partially aromatic polyamide, and the like; polyvinyl chloride films; polyvinylidene chloride films; and polycarbonate films. A support made of polylactic acid or cellulose produced from plant-derived raw materials can be preferably used.

In the support, if necessary, various additives used in a conventional substrate for a pressure-sensitive adhesive tape (support), such as ultraviolet absorbers, photostabilizers, antioxidants, fillers, pigments and dyes can be used.

If necessary, a surface of the support (substrate) may be subjected to common surface treatment in order to increase anchoring to the pressure-sensitive adhesive layer, and for example, oxidation treatment by chemical or physical method such as chromate treatment, exposure to ozone, exposure to flames, exposure to high voltage electric shock, or ionization radiation treatment may be carried out, or coating treatment with an undercoating agent or the like may be carried out. Further, in order to provide peeling properties, for example, coating treatment with a peeling agent of a silicone-based resin, a fluoro resin, or the like may be carried out between various kinds of pressure-sensitive adhesive layers to be formed on the support.

The thickness of the support (substrate) may be selected properly depending on its material or configuration, but the thickness is preferably, for example, 1000 µm or thinner, more preferably about 1 to 1000 µm, furthermore preferably about 2 to 500 µm, still more preferably about 3 to 300 µm, and particularly preferably about 5 to 250 µm.

As a method for forming the pressure-sensitive adhesive layer, a conventionally known method may be employed, and the formation method can be carried out based on a publicly-known production method of a pressure-sensitive adhesive sheet such as a method for forming a pressure-sensitive adhesive layer by applying a pressure-sensitive adhesive composition (a pressure-sensitive adhesive composition solution obtained by dissolving the pressure-sensitive adhesive composition in a solvent or a thermally melted solution) to the support (substrate) and drying the composition; a method for forming a pressure-sensitive adhesive layer by applying the pressure-sensitive adhesive composition to the support, drying the composition to form a pressure-sensitive adhesive composition layer, and further carrying out crosslinking treatment to form a pressure-sensitive adhesive layer; a method for transferring a pressure-sensitive adhesive layer formed on a release liner by application to a support; a method for extruding a material for forming a pressure-sensitive adhesive layer to a support (substrate), followed by application; a method for extruding a pressure-sensitive adhesive layer in a bi- or multi-layer form on a support (substrate); a method for mono-layer lamination of a pressure-sensitive adhesive layer on a support (substrate). Further, a method for bi- or multi-layer co-extrusion of a pressure-sensitive adhesive layer together with a support (substrate) made of a thermoplastic resin by an inflation method or a T-die method may be used. The pressure-sensitive adhesive sheet in the present invention includes a pressure-sensitive adhesive film, a pressure-sensitive adhesive tape, and the like.

As a method for applying the pressure-sensitive adhesive composition (solution), a conventionally known method may be employed, and examples of the method include roll coating, gravure coating, reverse roll coating, roll brush coating, air knife coating, spray coating, and extrusion coating with a die coater or the like.

The release liner is not particularly limited, and any conventionally known release liner may be properly used. For example, a product obtained by forming a release coating layer on at least one side of a substrate (substrate for release liner) may be used. The substrate for release liner may be used in the form of a monolayer or multilayer configuration.

Any of various thin materials such as plastic films, paper sheets, foamed products, and metal foils may be used as the substrate for release liner. A plastic film is particularly preferred. Examples of the material for the plastic film include polyester such as polyethylene terephthalate, polyolefin such as polypropylene or ethylene-propylene copolymer, and thermoplastic resin such as polyvinyl chloride.

The thickness of the substrate for release liner may be properly selected in accordance with the purpose.

The formation of the pressure-sensitive adhesive layer is not particularly limited, but the temperature for drying after application of the pressure-sensitive adhesive composition (solution) may be normally 60 to 150° C. and preferably 70 to 140° C.

EXAMPLES

The present invention will be described more in detail with reference to Examples of the present invention; however, the present invention is not limited by Examples. In Examples, "part(s)" means "part(s) by weight". The physical properties of polyesters are shown in Table 1, and the blending contents and evaluation results of the pressure-sensitive adhesive layers (pressure-sensitive adhesive sheets) are shown in Table 2. The physical properties of polyether polyols used in Examples are shown in Table 3.

<Preparation of Polyester A>

A four-neck separable flask equipped with a stirrer, a thermometer, a nitrogen introduction tube, and a condenser having a trap was charged with 100 parts of a carboxylic acid component (trade name: "PRIPOL 1025", manufactured by Croda, which contains a dimer acid as a dicarboxylic acid (molecular weight: 565) in an amount of 80% by weight and a trimer acid as a tricarboxylic acid (molecular weight: 846) in an amount of 20% by weight) and 30.3 parts of 1,4-butanediol (manufactured by Wako Pure Chemical Industries, Ltd., molecular weight: 90) as a diol component so that the mole ratio of the carboxylic acid component and the 1,4-butanediol was 1:1.9, and 0.1 parts of dibutyltin oxide (manufactured by Wako Pure Chemical Industries, Ltd.) as a catalyst, and the contents were heated to 180° C. and kept at this temperature for 8 hours while being stirred in a nitrogen atmosphere.

Thereafter, the nitrogen introduction tube and the condenser equipped with a trap were taken out and a vacuum pump was attached instead, and the contents were heated to 200° C. and kept at this temperature while being stirred in a reduced pressure atmosphere (0.002 MPa). The reaction was continued for about 2 hours to obtain a polyester A. The polyester A had a weight average molecular weight (Mw) of 10000.

<Preparation of Polyester B>

A four-neck separable flask equipped with a stirrer, a thermometer, a nitrogen introduction tube, and a condenser having a trap was charged with 100 parts of a carboxylic acid component (trade name: "PRIPOL 1025", manufactured by Croda, which contains a dimer acid as a dicarboxylic acid (molecular weight: 565) in an amount of 80% by weight and a trimer acid as a tricarboxylic acid (molecular weight: 846) in an amount of 20% by weight) and 25.5 parts of 1,4-butanediol (manufactured by Wako Pure Chemical Industries, Ltd., molecular weight: 90) as a diol component so that the mole ratio of the carboxylic acid component and the 1,4-butanediol was 1:1.6, and 0.1 parts of dibutyltin oxide (manufactured by Wako Pure Chemical Industries, Ltd.) as a catalyst, and the contents were heated to 180° C. and kept at this temperature for 8 hours while being stirred in a nitrogen atmosphere.

Thereafter, the nitrogen introduction tube and the condenser equipped with a trap were taken out and a vacuum pump was attached instead, and the contents were heated to 200° C. and kept at this temperature while being stirred in a reduced pressure atmosphere (0.002 MPa). The reaction was continued for about 4 hours to obtain a polyester B. The polyester B had a weight average molecular weight (Mw) of 120000.

<Preparation of Polyester C>

A four-neck separable flask equipped with a stirrer, a thermometer, a nitrogen introduction tube, and a condenser having a trap was charged with 100 parts of a carboxylic acid component (trade name: "PRIPOL 1006", manufactured by Croda, which contains a dimer acid as a dicarboxylic acid (molecular weight: 565) in an amount of 96% by weight and a trimer acid as a tricarboxylic acid (molecular weight: 846) in an amount of 4% by weight) and 23.9 parts of 1,4-butanediol (manufactured by Wako Pure Chemical Industries, Ltd., molecular weight: 90) as a diol component so that the mole ratio of the carboxylic acid component and the 1,4-butanediol was 1:1.5, and 0.1 parts of dibutyltin oxide (manufactured by Wako Pure Chemical Industries, Ltd.) as a catalyst, and the contents were heated to 180° C. and kept at this temperature for 8 hours while being stirred in a nitrogen atmosphere.

Thereafter, the nitrogen introduction tube and the condenser equipped with a trap were taken out and a vacuum pump was attached instead, and the contents were heated to 200° C. and kept at this temperature while being stirred in a reduced pressure atmosphere (0.002 MPa). The reaction was continued for about 10 hours to obtain a polyester C. The polyester C had a weight average molecular weight (Mw) of 30000.

<Preparation of Polyester D>

A four-neck separable flask equipped with a stirrer, a thermometer, a nitrogen introduction tube, and a condenser having a trap was charged with 100 parts of a carboxylic acid component (trade name: "PRIPOL 1009", manufactured by Croda, which contains a dimer acid as a dicarboxylic acid (molecular weight: 565) in an amount of 99% by weight and a trimer acid as a tricarboxylic acid (molecular weight: 846) in an amount of 1% by weight) and 23.9 parts of 1,4-butanediol (manufactured by Wako Pure Chemical Industries, Ltd., molecular weight: 90) as a diol component so that the mole ratio of the carboxylic acid component and the 1,4-butanediol was 1:1.5, and 0.1 parts of dibutyltin oxide (manufactured by Wako Pure Chemical Industries, Ltd.) as a catalyst, and the contents were heated to 180° C. and kept at this temperature for 8 hours while being stirred in a nitrogen atmosphere.

Thereafter, the nitrogen introduction tube and the condenser equipped with a trap were taken out and a vacuum pump was attached instead, and the contents were heated to 200° C. and kept at this temperature while being stirred in a reduced pressure atmosphere (0.002 MPa). The reaction was continued for about 10 hours to obtain a polyester D. The polyester D had a weight average molecular weight (Mw) of 20000.

<Preparation of Polyester E>

A four-neck separable flask equipped with a stirrer, a thermometer, a nitrogen introduction tube, and a condenser having a trap was charged with 100 parts of a carboxylic acid component (trade name: "PRIPOL 1025", manufactured by Croda, which contains a dimer acid as a dicarboxylic acid (molecular weight: 565) in an amount of 80% by weight and a trimer acid as a tricarboxylic acid (molecular weight: 846) in an amount of 20% by weight) and 35 parts of 1,4-butanediol (manufactured by Wako Pure Chemical Industries, Ltd., molecular weight: 90) as a diol component so that the mole ratio of the carboxylic acid component and the 1,4-butanediol was 1:2.2, and 0.1 parts of dibutyltin oxide (manufactured by Wako Pure Chemical Industries, Ltd.) as a catalyst, and the contents were heated to 180° C. and kept at this temperature for 8 hours while being stirred in a nitrogen atmosphere.

Thereafter, the nitrogen introduction tube and the condenser equipped with a trap were taken out and a vacuum pump was attached instead, and the contents were heated to 200° C. and kept at this temperature while being stirred in a reduced pressure atmosphere (0.002 MPa). The reaction was continued for about 1.5 hours to obtain a polyester E. The polyester E had a weight average molecular weight (Mw) of 4000.

<Preparation of Polyester F>

A four-neck separable flask equipped with a stirrer, a thermometer, a nitrogen introduction tube, and a condenser having a trap was charged with 100 parts of a carboxylic acid component (trade name: "PRIPOL 1025", manufactured by Croda, which contains a dimer acid as a dicarboxylic acid (molecular weight: 565) in an amount of 80% by weight and a trimer acid as a tricarboxylic acid (molecular weight: 846) in an amount of 20% by weight) and 20.7 parts of 1,4-butanediol (manufactured by Wako Pure Chemical Industries, Ltd., molecular weight: 90) as a diol component so that the mole ratio of the carboxylic acid component and the 1,4-butanediol was 1:1.3, and 0.2 parts of dibutyltin oxide (manufactured by Wako Pure Chemical Industries, Ltd.) as a catalyst, and the contents were heated to 180° C. and kept at this temperature for 8 hours while being stirred in a nitrogen atmosphere.

Thereafter, the nitrogen introduction tube and the condenser equipped with a trap were taken out and a vacuum pump was attached instead, and the contents were heated to 200° C. and kept at this temperature while being stirred in a reduced pressure atmosphere (0.002 MPa). The reaction was continued for about 4 hours to obtain a polyester F. The polyester F had a weight average molecular weight (Mw) of 160000, but gelation was significant, the viscosity was extremely high, and handling was difficult.

Example 1

Twelve parts of polyhexamethylene diisocyanate (trade name: "TPA-100", manufactured by Asahi Kasei Chemicals Corporation) as a crosslinking agent and 50 to 150 parts of toluene as a solvent were blended with 100 parts of the polyester A to adjust viscosity (e.g., about 10 Pa·s) for easy application and processing, so that a polyester-based pressure-sensitive adhesive composition was obtained. This composition was applied to a polyethylene terephthalate (PET) film (trade name: "Lumirror 38 S10", manufactured by PANAC Corporation) as the substrate with 38 μm thickness in such a manner that the pressure-sensitive adhesive layer obtained by drying (after drying) had a thickness of 10 μm, and dried at 100° C. for 3 minutes to obtain a pressure-sensitive adhesive layer. Thereafter, the pressure-sensitive adhesive layer was bonded to the peeling-treated surface of a polyethylene terephthalate (PET) film (thickness: 38 μm, trade name: "Diafoil MRE#38", manufactured by Mitsubishi Plastics Inc.) subjected to peeling treatment, and the resultant was left at 50° C. for 3 days to obtain a pressure-sensitive adhesive sheet (for surface protection) having a support and a pressure-sensitive adhesive layer formed on the support.

Example 2

A pressure-sensitive adhesive sheet was obtained in the same manner as in Example 1, except that 10 parts of the crosslinking agent was blended with 100 parts of the polyester B.

Example 3

A pressure-sensitive adhesive sheet was obtained in the same manner as in Example 1, except that 25 parts of polybutylene glycol containing hydroxyl groups at both terminals (trade name: "Uniol PB-500", manufactured by Nippon Oil & Fats Co., Ltd., number average molecular weight (Mn): 500) and 20 parts of the crosslinking agent were blended with 100 parts of the polyester A.

Example 4

A pressure-sensitive adhesive sheet was obtained in the same manner as in Example 1, except that 50 parts of the crosslinking agent and 150 parts of polytetramethylene ether glycol having a number average molecular weight (Mn) of 1000 (trade name: "PTG-1000SN", manufactured by Hodogaya Chemical Co., Ltd.) were blended with 100 parts of the polyester A.

Example 5

A pressure-sensitive adhesive sheet was obtained in the same manner as in Example 1, except that 30 parts of the crosslinking agent and 150 parts of polytetramethylene ether glycol having a number average molecular weight (Mn) of 3000 (trade name: "PTG-3000SN", manufactured by Hodogaya Chemical Co., Ltd.) were blended with 100 parts of the polyester A.

Example 6

A pressure-sensitive adhesive sheet was obtained in the same manner as in Example 1, except that 50 parts of the crosslinking agent and 150 parts of polytrimethylene ether glycol having a number average molecular weight (Mn) of 1000 (trade name: "Cerenol H1000", manufactured by DuPont) were blended with 100 parts of the polyester A.

Example 7

A pressure-sensitive adhesive sheet was obtained in the same manner as in Example 1, except that 50 parts of the crosslinking agent and 150 parts of copolyether polyol having a number average molecular weight (Mn) of 1000 (trade name: "PTG-L1000", manufactured by Hodogaya Chemical Co., Ltd.) were blended with 100 parts of the polyester A.

Example 8

A pressure-sensitive adhesive sheet was obtained in the same manner as in Example 1, except that 40 parts of the crosslinking agent and 150 parts of copolyether polyol having a number average molecular weight (Mn) of 2000 (trade name: "PTG-L2000", manufactured by Hodogaya Chemical Co., Ltd.) were blended with 100 parts of the polyester A.

Example 9

A pressure-sensitive adhesive sheet was obtained in the same manner as in Example 1, except that 30 parts of the crosslinking agent and 150 parts of copolyether polyol having a number average molecular weight (Mn) of 3000 (trade name: "PTG-L3000", manufactured by Hodogaya Chemical Co., Ltd.) were blended with 100 parts of the polyester A.

Comparative Example 1

A pressure-sensitive adhesive sheet was obtained in the same manner as in Example 1, except that 10 parts of the crosslinking agent was blended with 100 parts of the polyester C.

Comparative Example 2

A pressure-sensitive adhesive sheet was obtained in the same manner as in Example 1, except that 10 parts of the crosslinking agent was blended with 100 parts of the polyester D.

Comparative Example 3

A pressure-sensitive adhesive sheet was obtained in the same manner as in Example 1, except that 20 parts of the crosslinking agent was blended with 100 parts of the polyester E.

Comparative Example 4

Production of a pressure-sensitive adhesive sheet was attained by using the polyester F, but gelation of the polyester F was significant and the viscosity was extremely high, so that the polyester F could not be mixed with raw materials such as crosslinking agent, and a pressure-sensitive adhesive sheet was not obtained.

(Weight Average Molecular Weight)

The weight average molecular weight (Mw) was measured as follows: about 0.2 g of each polyester was collected on a petri dish, and the solvent was removed by drying at 120° C. for 2 hours. Then, 0.01 g of the polyester layer on the petri dish was weighed, which was added to 10 g of tetrahydrofuran (THF) and left for 24 hours for dissolution. The obtained solution was subjected to gel permeation chromatography (GPC), and the molecular weight of each polyester was measured based on the calibration curve produced using standard polystyrene.

(Measurement Conditions)

Apparatus name: HLC-8220GPC, manufactured by Tosoh Corporation

Test piece concentration: 0.1% by weight (THF solution)

Test piece injection amount: 20 µl

Fluent: THF

Flow rate: 0.300 ml/min

Measurement (column) temperature: 40° C.

Column: Test piece column; TSKguardcolumn SuperHZ-L (1 column)+TSKgel SuperHZM-M (2 columns), reference column; TSKgel SuperH-RC (1 column), manufactured by Tosoh Corporation Detector: Differential refractometer (RI)

(Gel Fraction of Pressure-sensitive Adhesive Layer)

Each of the pressure-sensitive adhesive sheets having a thickness of 30 µm obtained in Examples and Comparative Examples was cut in a size of 5 cm×5 cm. The support was removed from the cut pressure-sensitive adhesive sheet to obtain a test piece, and this test piece was wrapped with a Teflon (registered trade name) sheet with a known weight, and the obtained test piece was weighed and then left at 23° C. for 7 days in toluene to extract the sol component from the test piece. Thereafter, the resulting test piece was dried at 120° C. for 2 hours and then weighed. The gel fraction was calculated according to the following equation.

Gel fraction (% by weight)=(weight after drying–weight of Teflon (registered trade name) sheet)/(weight before drying–weight of Teflon (registered trade name) sheet)×100

(Adhesive Strength)

Each of the pressure-sensitive adhesive sheets having a pressure-sensitive adhesive layer thickness of 10 µm obtained in Examples and Comparative Examples was cut in 25 mm width, and the pressure-sensitive adhesive surface of the pressure-sensitive adhesive sheet was bonded to a tin-untreated surface of alkali glass (manufactured by Matsunami Glass Ind., Ltd.) and a pressure-sensitive adhesive sheet having a pressure-sensitive adhesive layer thickness of 30 µm was bonded to a SUS 304 plate (manufactured by Toyo Seihaku Co., Ltd.) to obtain each test piece, and the adhesive strength to a blue plate glass (adhesive strength to glass) (N/25 mm) was measured. The pressure bonding at the time of bonding was carried out by reciprocating a 2 kg roller one time, and the measurement of adhering strength (adhesive strength) at 180° peeling was carried out using a tensile compression tester (apparatus name: "TG-1 kN", manufactured by Minebea Co., Ltd.) in the following conditions.

Tension (peeling) rate: 300 mm/min

Measurement conditions: temperature: 23±2° C., humidity 65±5% RH

The adhesive strength (peel strength) to glass is preferably 0.5 N/25 mm or less, more preferably 0.4 N/25 mm or less, and furthermore preferably 0.3 N/25 mm or less. If the adhesive strength exceeds 0.5 N/25 mm, the adhesive strength is too high so that light peelability (removability) cannot be attained, and for example, in the case of using the test piece as a pressure-sensitive adhesive sheet for surface protection, adhesive residues may remain on an adherend at the time of peeling thereafter, and the support (substrate) may be damaged, and therefore it is not preferable.

(Anti-staining Property)

Presence or absence of staining on an adherend was evaluated in accordance with presence or absence of traces of bleeding out or presence or absence of adhesive residues by visual observing, the surface of the adherend which had contact with pressure-sensitive adhesive layer after the measurement of the adhesive strength.

(Wettability)

Each of the pressure-sensitive adhesive sheets obtained in Examples and Comparative Examples was cut in 25 mm width and 70 mm length, and the pressure-sensitive adhesive surface was dropped calmly onto a glass plate, and the motion-pictures of widening of the surface area of the pressure-sensitive adhesive surface per one second were taken by a video camera. The color shades owing to wetting were then binarized for every 0.5 seconds so that the wet surface area was measured, and the wetting rate ($cm^2/s$) was calculated for evaluation.

The wetting rate of the pressure-sensitive adhesive sheet of the present invention is preferably 0.6 $cm^2/s$ or more, more preferably 1.0 $cm^2/s$ or more, and particularly preferably 3.0 $cm^2/s$. If the wetting rate is less than 0.6 $cm^2/s$, handleability may be inferior and air bubbles may be easily included, and the appearance of the adherend to which a surface protective sheet is bonded is worsened, and therefore it is not preferable.

TABLE 1

| Polyester | Carboxylic acid component | | Diol | |
| --- | --- | --- | --- | --- |
| | Dicarboxylic acid (% by weight) | Tricarboxylic acid (% by weight) | component (carbon number) | Molecular weight (Mw) |
| A | 80 | 20 | 1,4-butanediol (4) | 10,000 |
| B | 80 | 20 | 1,4-butanediol (4) | 120,000 |
| C | 96 | 4 | 1,4-butanediol (4) | 30,000 |
| D | 99 | 1 | 1,4-butanediol (4) | 20,000 |
| E | 80 | 20 | 1,4-butanediol (4) | 4,000 |
| F | 80 | 20 | 1,4-butanediol (4) | 160,000 |

TABLE 2

| Blending and evaluation results | Unit | Example | | | | | | | | | Comparative Example | | | |
| --- | --- | --- | --- | --- | --- | --- | --- | --- | --- | --- | --- | --- | --- | --- |
| | | 1 | 2 | 3 | 4 | 5 | 6 | 7 | 8 | 9 | 1 | 2 | 3 | 4 |
| Polyester | — | A | B | A | A | A | A | A | A | A | C | D | E | F |
| | Parts by weight | 100 | 100 | 100 | 100 | 100 | 100 | 100 | 100 | 100 | 100 | 100 | 100 | 100 |
| Polyether polyol | — | — | — | — | G | H | I | J | K | L | — | — | — | — |
| | Parts by weight | — | — | — | 150 | 150 | 150 | 150 | 150 | 150 | — | — | — | — |
| Cross-linking agent | Parts by weight | 12 | 10 | 20 | 50 | 30 | 50 | 50 | 40 | 30 | 10 | 10 | 20 | Non-mixable |
| Gel fraction | % by weight | 88 | 93 | 87 | 95 | 97 | 96 | 97 | 98 | 97 | 80 | 77 | Non-measurable | Non-measurable |
| Adhesive strength to glass | N/25 mm | 0.02 | 0.04 | 0.04 | 0.04 | 0.03 | 0.04 | 0.03 | 0.03 | 0.03 | 0.60 | 0.60 | Non-evaluable | Non-evaluable |
| Wetting rate | cm²/sec | 4.0 | 3.5 | 4.5 | 4.6 | 4.5 | 4.8 | 4.8 | 4.9 | 5.0 | 4.0 | 5.0 | Non-evaluable | Non-evaluable |
| Presence or absence of staining | — | Absence | Absence | Absence | Absence | Absence | Absence | Absence | Absence | Absence | Absence | Absence | Presence | Non-evaluable |

TABLE 3

| Polyether polyol | Kind | Number average molecular weight (Mn) |
| --- | --- | --- |
| G | Polytetramethylene ether glycol | 1,000 |
| H | Polytetramethylene ether glycol | 3,000 |
| I | Polytetramethylene ether glycol | 1,000 |
| J | Copolyether polyol | 1,000 |
| K | Copolyether polyol | 2,000 |
| L | Copolyether polyol | 3,000 |

From the results of evaluation in Table 2, regarding Examples 1 to 9, since carboxylic acid components each containing a dicarboxylic acid and a tricarboxylic acid at a desired ratio were used and polyesters each with a desired weight average molecular weight were used, pressure-sensitive adhesive layers (pressure-sensitive adhesive sheets) were obtained which had desired gel fraction and adhesive strength (peel strength), had good wettability at the time of bonding to an adherend and excellent workability, had no adhesive residues even after being peeled off, and had excellent light peelability (removability), and anti-staining properties. It was confirmed that in the pressure-sensitive adhesive layers (pressure-sensitive adhesive sheets), a wide range of pressure-sensitive adhesion design is possible.

On the other hand, in Comparative Examples 1 and 2, it was confirmed that since a carboxylic acid component containing a dicarboxylic acid and a tricarboxylic acid at a desired ratio was not used, the adhesive strength was high and there was a problem on light peelability (removability). In Comparative Example 3, since a polyester having weight average molecular weight smaller than the desired weight average molecular weight was used, a pressure-sensitive adhesive sheet having a gelled pressure-sensitive adhesive layer could not be obtained, and staining such as adhesive residues on an adherend was observed. In Comparative Example 4, since a polyester having weight average molecular weight larger than the desired weight average molecular weight was used, gelation of the polyester was significant and the viscosity was extremely high, so that the polyester could not be mixed with other raw materials, and a pressure-sensitive adhesive sheet itself was not obtained.

The invention claimed is:
1. A polyester-based pressure-sensitive adhesive composition comprising a polyester and a crosslinking agent, wherein
the polyester is obtained by condensation polymerization of only a carboxylic acid component and a diol component,
the carboxylic acid component contains only a dicarboxylic acid having a side chain and a tricarboxylic acid having a side chain,
the carboxylic acid component contains a dicarboxylic acid having a side chain in an amount of 60 to 85% by weight and a tricarboxylic acid having a side chain in an amount of 15 to 40% by weight, and
the polyester has a weight average molecular weight of 10000 to 150000.

2. The polyester-based pressure-sensitive adhesive composition according to claim 1, wherein the diol component contains an aliphatic diol having 3 to 10 carbon atoms.

3. The polyester-based pressure-sensitive adhesive composition according to claim 1, further comprising a polyether polyol.

4. A pressure-sensitive adhesive sheet comprising a support and a pressure-sensitive adhesive layer obtained by crosslinking the polyester-based pressure-sensitive adhesive composition according to claim 1 and formed on at least one surface of the support, wherein
the pressure-sensitive adhesive layer has a gel fraction of 70 to 98% by weight.

5. The pressure-sensitive adhesive sheet according to claim 4, which has an adhesive strength to glass of 0.5 N/25 mm or less.

6. The pressure-sensitive adhesive sheet according to claim 4, which is used for surface protection.

* * * * *